US008428955B2

(12) United States Patent
Olson (10) Patent No.: US 8,428,955 B2
(45) Date of Patent: Apr. 23, 2013

(54) ADJUSTING RECORDER TIMING

(75) Inventor: Kenneth Olson, Ann Arbor, MI (US)

(73) Assignee: ROVI Technologies Corporation, Santa Clara, CA (US)

( * ) Notice: Subject to any disclaimer, the term of this patent is extended or adjusted under 35 U.S.C. 154(b) by 505 days.

(21) Appl. No.: 12/578,193

(22) Filed: Oct. 13, 2009

(65) Prior Publication Data

US 2011/0087490 A1    Apr. 14, 2011

(51) Int. Cl.
*G10L 23/00*    (2009.01)

(52) U.S. Cl.
USPC .......................................... 704/273; 386/296

(58) Field of Classification Search .................. 704/273; 386/296, 299; 380/53
See application file for complete search history.

(56) References Cited

U.S. PATENT DOCUMENTS

| | | | |
|---|---|---|---|
| 7,277,766 B1 | 10/2007 | Khan et al. ........................ 700/94 |
| 7,451,078 B2 | 11/2008 | Bogdanov ....................... 704/200 |
| 2001/0031129 A1 | 10/2001 | Tajima | |
| 2002/0088009 A1 | 7/2002 | Dukiewicz et al. | |
| 2003/0093790 A1* | 5/2003 | Logan et al. ..................... 725/38 |
| 2007/0143778 A1 | 6/2007 | Covell et al. | |
| 2008/0027734 A1 | 1/2008 | Zhao et al. ...................... 704/502 |
| 2008/0066099 A1 | 3/2008 | Brodersen et al. | |
| 2008/0148313 A1 | 6/2008 | Ozawa et al. | |
| 2008/0187188 A1* | 8/2008 | Beletski et al. ................. 382/124 |
| 2009/0077578 A1* | 3/2009 | Steuer et al. ..................... 725/18 |
| 2010/0008644 A1 | 1/2010 | Kim | |
| 2010/0205174 A1* | 8/2010 | Jiang et al. ..................... 707/725 |
| 2011/0041154 A1 | 2/2011 | Olson | |
| 2011/0085781 A1 | 4/2011 | Olson | |
| 2011/0122255 A1* | 5/2011 | Haritaoglu ..................... 348/180 |

OTHER PUBLICATIONS

L. de C.T. Gomes, et al., "Audio Watermarking and Fingerprinting: For Which Applications?", Journal of New Music Research, Swets & Zeitlinger, vol. 32, No. 1, Mar. 1, 2003, pp. 65-81.
International Search Report and Written Opinion of the International Searching Authority, PCT/US2010/049698, Dec. 10, 2010.

* cited by examiner

*Primary Examiner* — Abul Azad
(74) *Attorney, Agent, or Firm* — Ropes & Gray LLP (57) ABSTRACT

A portion of audio content of a multimedia program, such as a television program, is captured from a network. An audio fingerprint is generated based on the portion of audio content, and the audio fingerprint is matched to one of multiple theme song fingerprints stored in a database. An expected theme song time offset associated with the matched theme song fingerprint is retrieved from the database. It is determined whether the program is running on-schedule, based on the time the portion of audio content occurred, a scheduled start time of the program, and/or the expected theme song time offset. If it is determined that the program is running off-schedule, an adjusted start time and/or an adjusted end time of the program are calculated. The program is recorded by a recorder based on the adjusted start time and/or the adjusted end time.

24 Claims, 7 Drawing Sheets

ADJUSTING RECORDER TIMING

BACKGROUND

1. Field

Example aspects of the present invention generally relate to video recording, and more particularly to adjusting recorder timing by using audio identification.

2. Related Art

Digital video recorders (DVRs), also referred to as personal video recorders (PVRs), have changed the way consumers view media content on televisions and/or other consumer electronic ("CE") devices. Today, consumers can configure a DVR to automatically record media content, such as a television program, that is scheduled for broadcast at some time in the future. The DVR performs the recording based on scheduled listings data or electronic program guide (EPG) data, which indicates the channel, scheduled program start time, and scheduled program end time of the program to be recorded. Once the program is recorded to the DVR, the consumer controls the DVR to view the program on a television or other CE device at a time convenient for the consumer.

Programs can be properly recorded to DVRs based on scheduled listings data so long as the programs are actually broadcasted according to the channels, scheduled program start times, and scheduled program end times indicated by the scheduled listings data. Sometimes, however, a program runs beyond its scheduled program end time, causing a subsequent program to be broadcasted at a later time than scheduled. This is especially true in the case of live programs. Because a DVR recording is only as accurate as the most recent scheduled listings data, a DVR configured to record a program that follows the live program typically records the final portion of the live program and misses the final portion of the program intended to be recorded.

BRIEF DESCRIPTION

Despite the technical efforts to increase the timeliness of data updates for scheduled listings, update rates typically remain too slow to effectively react to live programs running behind schedule. One conventional approach has been to use a flag to indicate that a program is live. If a consumer wishes to record a program following a live program, the DVR provides the consumer with options for incrementally extending the end recording time. Typically, this process includes beginning the recording at the scheduled program start time, and extending the recording beyond the scheduled program end time in, for example, 30 minute increments. In this way, however, the recording typically includes an undesired final portion of the live program and an undesired beginning portion of the program following the desired program. Or, if the increment is set too small, then the DVR misses the final portion of the desired program. This approach yields unpredictable results and uses up valuable memory space by storing undesired programming.

Given the foregoing, it would be useful to enable a DVR to automatically detect changes in the actual program start time and actual program end time of a media content broadcast, and respond to such changes by adjusting the start time and stop time used by the DVR to record the broadcast. Doing so would improve convenience for consumers and make more efficient use of memory space available on DVRs. One technical challenge in doing so, however, is detecting when specific media content is actually broadcasted.

The example embodiments described herein meet the above-identified needs by providing methods, systems and computer program products for adjusting digital video recorder timing by using audio identification. The system includes a processor that captures a portion of audio content of a multimedia program from a network. The processor generates an audio fingerprint based on the portion of audio content. The audio fingerprint is matched to one of multiple theme song fingerprints having corresponding audio identifiers (Audio_ID) stored in a database. The processor retrieves from the database an expected theme song time offset associated with the matched theme song fingerprint stored in the database. The processor determines whether the multimedia program is running on-schedule based on the time the portion of audio content occurred, the scheduled program start time of the multimedia program, and/or the expected theme song time offset.

In another aspect, the processor determines that the portion of audio content occurred at a time that exceeds a predetermined threshold. A time delta, which may also be referred to herein as a delta, is calculated based on the time the portion of audio content occurred and the expected theme song time offset. An adjusted start time and/or an adjusted end time of the multimedia program are calculated based on the time delta. The processor records the multimedia program based on the adjusted start time and/or the adjusted end time of the program.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments presented herein will become more apparent from the detailed description set forth below when taken in conjunction with the drawings in which like reference numbers indicate identical or functionally similar elements.

DETAILED DESCRIPTION

Systems, methods, apparatus and computer-readable media are provided for adjusting recorder timing by using audio identification. An audio portion of media content, such as a television program, is captured and an audio fingerprint is generated from the portion of audio content. The content may also be individually and/or collectively referred to as media or multimedia content. The audio fingerprint is matched to one of multiple predetermined theme song fingerprints, which have corresponding audio identifiers (Audio_ID), stored in a database. An expected theme song time offset ($t_{offset}$) associated with the matched theme song fingerprint is retrieved from the database. A determination is then made as to whether the program is running "on-schedule" based on the time the portion of audio content occurred, a scheduled program start time ($t_{sched\_prog\_start}$), and/or the expected theme song time offset ($t_{offset}$). If it is determined that the program is running on-schedule, then the recorder records the program by using the scheduled program start time ($t_{sched\_prog\_start}$) and scheduled program end time ($t_{sced\_prog\_end}$) indicated by scheduled listings data. If it is determined that the program is running "off-schedule" then the recorder calculates an adjusted start time and an adjusted end time, which are then used to record the program. Exemplary aspects and embodiments are now described in more detail herein in terms of a recorder that executes program code to recognize the audio portion of a television program while the program is delivered, to determine whether the program is running on-schedule, and to adjust the timing used to record the program if the program is running off-schedule. This is for convenience only and is not intended to limit the application of the present description. In fact, after reading the following description, it will be apparent to one skilled in the relevant art(s) how to implement the following invention in alternative embodiments such as, for example, by using a local area network, an Internet-connected general purpose computer, a mobile telephone, etc.

DEFINITIONS

The terms "content," "media content," "multimedia content," "program," "multimedia program," "show," and the like, are generally understood to include television shows, movies, games and videos of various types.

"Electronic program guide" or "EPG" data provides a digital guide for a scheduled broadcast television typically displayed on-screen and can be used to allow a viewer to navigate, select, and discover content by time, title, channel, genre, etc. by use of their remote control, a keyboard, or other similar input devices. In addition, EPG data information can be used to schedule future recording by a digital video recorder (DVR) or personal video recorder (PVR).

Some additional terms are defined below in alphabetical order for easy reference. These terms are not rigidly restricted to these definitions. A term may be further defined by its use in other sections of this description.

"Album" means a collection of tracks. An album is typically originally published by an established entity, such as a record label (e.g., a recording company such as Warner Brothers and Universal Music).

"Audio Fingerprint" (e.g., "fingerprint", "acoustic fingerprint", "digital fingerprint") is a digital measure of certain acoustic properties that is deterministically generated from an audio signal that can be used to identify an audio sample and/or quickly locate similar items in an audio database. An audio fingerprint typically operates as a unique identifier for a particular item, such as, for example, a CD, a DVD and/or a Blu-ray Disc. The term "identifier" is defined below. An audio fingerprint is an independent piece of data that is not affected by metadata. Rovi™ Corporation has databases that store over 25 million unique fingerprints for various audio samples. Practical uses of audio fingerprints include without limitation identifying songs, identifying records, identifying melodies, identifying tunes, identifying advertisements, monitoring radio broadcasts, monitoring multipoint and/or peer-to-peer networks, managing sound effects libraries and identifying video files.

"Audio Fingerprinting" is the process of generating an audio fingerprint. U.S. Pat. No. 7,277,766, entitled "Method and System for Analyzing Digital Audio Files", which is herein incorporated by reference, provides an example of an apparatus for audio fingerprinting an audio waveform. U.S. Pat. No. 7,451,078, entitled "Methods and Apparatus for Identifying Media Objects", which is herein incorporated by reference, provides an example of an apparatus for generating an audio fingerprint of an audio recording.

"Blu-ray", also known as Blu-ray Disc, means a disc format jointly developed by the Blu-ray Disc Association, and personal computer and media manufacturers including Apple, Dell, Hitachi, HP, JVC, LG, Mitsubishi, Panasonic, Pioneer, Philips, Samsung, Sharp, Sony, TDK and Thomson. The format was developed to enable recording, rewriting and playback of high-definition (HD) video, as well as storing large amounts of data. The format offers more than five times the storage capacity of conventional DVDs and can hold 25 GB on a single-layer disc and 800 GB on a 20-layer disc. More layers and more storage capacity may be feasible as well. This extra capacity combined with the use of advanced audio and/or video codecs offers consumers an unprecedented HD experience. While current disc technologies, such as CD and DVD, rely on a red laser to read and write data, the Blu-ray format uses a blue-violet laser instead, hence the name Blu-ray. The benefit of using a blue-violet laser (605 nm) is that it has a shorter wavelength than a red laser (650 nm). A shorter wavelength makes it possible to focus the laser spot with greater precision. This added precision allows data to be packed more tightly and stored in less space. Thus, it is possible to fit substantially more data on a Blu-ray Disc even though a Blu-ray Disc may have substantially similar physical dimensions as a traditional CD or DVD.

"Chapter" means an audio and/or video data block on a disc, such as a Blu-ray Disc, a CD or a DVD. A chapter stores at least a portion of an audio and/or video recording.

"Compact Disc" (CD) means a disc used to store digital data. A CD was originally developed for storing digital audio. Standard CDs have a diameter of 740 mm and can typically hold up to 80 minutes of audio. There is also the mini-CD, with diameters ranging from 60 to 80 mm. Mini-CDs are sometimes used for CD singles and typically store up to 24 minutes of audio. CD technology has been adapted and expanded to include without limitation data storage CD-ROM, write-once audio and data storage CD-R, rewritable media CD-RW, Super Audio CD (SACD), Video Compact Discs (VCD), Super Video Compact Discs (SVCD), Photo CD, Picture CD, Compact Disc Interactive (CD-i), and Enhanced CD. The wavelength used by standard CD lasers is 650 nm, and thus the light of a standard CD laser typically has a red color.

"Database" means a collection of data organized in such a way that a computer program may quickly select desired pieces of the data. A database is an electronic filing system. In some implementations, the term "database" may be used as shorthand for "database management system".

"Device" means software, hardware or a combination thereof. A device may sometimes be referred to as an apparatus. Examples of a device include without limitation a software application such as Microsoft Word™, a laptop computer, a database, a server, a display, a computer mouse, and a hard disk. Each device is configured to carry out one or more steps of the method of storing an internal identifier in metadata.

"Digital Video Disc" (DVD) means a disc used to store digital data. A DVD was originally developed for storing digital video and digital audio data. Most DVDs have substantially similar physical dimensions as compact discs (CDs), but DVDs store more than six times as much data. There is also the mini-DVD, with diameters ranging from 60 to 80 mm. DVD technology has been adapted and expanded to include DVD-ROM, DVD-R, DVD+R, DVD-RW, DVD+RW and DVD-RAM. The wavelength used by standard DVD lasers is 650 nm, and thus the light of a standard DVD laser typically has a red color.

"Fuzzy search" (e.g., "fuzzy string search", "approximate string search") means a search for text strings that approximately or substantially match a given text string pattern. Fuzzy searching may also be known as approximate or inexact matching. An exact match may inadvertently occur while performing a fuzzy search.

"Signature" means an identifying means that uniquely identifies an item, such as, for example, a track, a song, an album, a CD, a DVD and/or Blu-ray Disc, among other items. Examples of a signature include without limitation the following in a computer-readable format: an audio fingerprint, a portion of an audio fingerprint, a signature derived from an audio fingerprint, an audio signature, a video signature, a disc signature, a CD signature, a DVD signature, a Blu-ray Disc signature, a media signature, a high definition media signature, a human fingerprint, a human footprint, an animal fingerprint, an animal footprint, a handwritten signature, an eye print, a biometric signature, a retinal signature, a retinal scan, a DNA signature, a DNA profile, a genetic signature and/or a genetic profile, among other signatures. A signature may be any computer-readable string of characters that comports with any coding standard in any language. Examples of a coding standard include without limitation alphabet, alphanumeric, decimal, hexadecimal, binary, American Standard Code for Information Interchange (ASCII), Unicode and/or Universal Character Set (UCS). Certain signatures may not initially be computer-readable. For example, latent human fingerprints may be printed on a door knob in the physical world. A signature that is initially not computer-readable may be converted into a computer-readable signature by using any appropriate conversion technique. For example, a conversion technique for converting a latent human fingerprint into a computer-readable signature may include a ridge characteristics analysis.

"Link" means an association with an object or an element in memory. A link is typically a pointer. A pointer is a variable that contains the address of a location in memory. The location is the starting point of an allocated object, such as an object or value type, or the element of an array. The memory may be located on a database or a database system. "Linking" means associating with (e.g., pointing to) an object in memory.

"Metadata" generally means data that describes data. More particularly, metadata may be used to describe the contents of digital recordings. Such metadata may include, for example, a track name, a song name, artist information (e.g., name, birth date, discography), album information (e.g., album title, review, track listing, sound samples), relational information (e.g., similar artists and albums, genre) and/or other types of supplemental information such as advertisements, links or programs (e.g., software applications), and related images. Metadata may also include a program guide listing of the songs or other audio content associated with multimedia content. Conventional optical discs (e.g., CDs, DVDs, Blu-ray Discs) do not typically contain metadata. Metadata may be associated with a digital recording (e.g., song, album, movie or video) after the digital recording has been ripped from an optical disc, converted to another digital audio format and stored on a hard drive.

"Network" means a connection between any two or more computers, which permits the transmission of data. A network may be any combination of networks, including without limitation the Internet, a local area network, a wide area network, a wireless network and a cellular network.

"Occurrence" means a copy of a recording. An occurrence is preferably an exact copy of a recording. For example, different occurrences of a same pressing are typically exact copies. However, an occurrence is not necessarily an exact copy of a recording, and may be a substantially similar copy. A recording may be an inexact copy for a number of reasons, including without limitation an imperfection in the copying process, different pressings having different settings, different copies having different encodings, and other reasons. Accordingly, a recording may be the source of multiple occurrences that may be exact copies or substantially similar copies. Different occurrences may be located on different devices, including without limitation different user devices, different MP3 players, different databases, different laptops, and so on. Each occurrence of a recording may be located on any appropriate storage medium, including without limitation floppy disk, mini disk, optical disc, Blu-ray Disc, DVD, CD-ROM, micro-drive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of storage device. Occurrences may be compiled, such as in a database or in a listing.

"Pressing" (e.g., "disc pressing") means producing a disc in a disc press from a master. The disc press preferably produces a disc for a reader that utilizes a laser beam having a wavelength of about 780 nm for CD, about 650 nm for DVD, about 405 nm for Blu-ray Disc or another wavelength as may be appropriate.

"Recording" means media data for playback. A recording is preferably a computer readable digital recording and may be, for example, an audio track, a video track, a song, a chapter, a CD recording, a DVD recording and/or a Blu-ray Disc recording, among other things.

"Server" means a software application that provides services to other computer programs (and their users), in the same or other computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Software" means a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++ and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"Song" means a musical composition. A song is typically recorded onto a track by a record label (e.g., recording company). A song may have many different versions, for example, a radio version and an extended version.

"System" means a device or multiple coupled devices. A device is defined above.

"Theme song" means any audio content that is a portion of a multimedia program, such as a television program, and that recurs across multiple occurrences, or episodes, of the multimedia program. A theme song may be a signature tune, song, and/or other audio content, and may include music, lyrics, and/or sound effects. A theme song may occur at any time during the multimedia program transmission, but typically plays during a title sequence and/or during the end credits.

"Track" means an audio/video data block. A track may be on a disc, such as, for example, a Blu-ray Disc, a CD or a DVD.

"User" means a consumer, client, and/or client device in a marketplace of products and/or services.

"User device" (e.g., "client", "client device", "user computer") is a hardware system, a software operating system and/or one or more software application programs. A user device may refer to a single computer or to a network of interacting computers. A user device may be the client part of a client-server architecture. A user device typically relies on a server to perform some operations. Examples of a user device include without limitation a television, a CD player, a DVD player, a Blu-ray Disc player, a personal media device, a portable media player, an iPod™, a Zoom Player, a laptop computer, a palmtop computer, a smart phone, a cell phone, a mobile phone, an MP3 player, a digital audio recorder, a digital video recorder, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

"Web browser" means any software program which can display text, graphics, or both, from Web pages on Web sites. Examples of a Web browser include without limitation Mozilla Firefox™ and Microsoft Internet Explorer™.

"Web page" means any documents written in mark-up language including without limitation HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web server" refers to a computer or other electronic device which is capable of serving at least one Web page to a Web browser. An example of a Web server is a Yahoo™ Web server.

"Web site" means at least one Web page, and more commonly a plurality of Web pages, virtually coupled to form a coherent group.

System Architecture

Figure 1A:
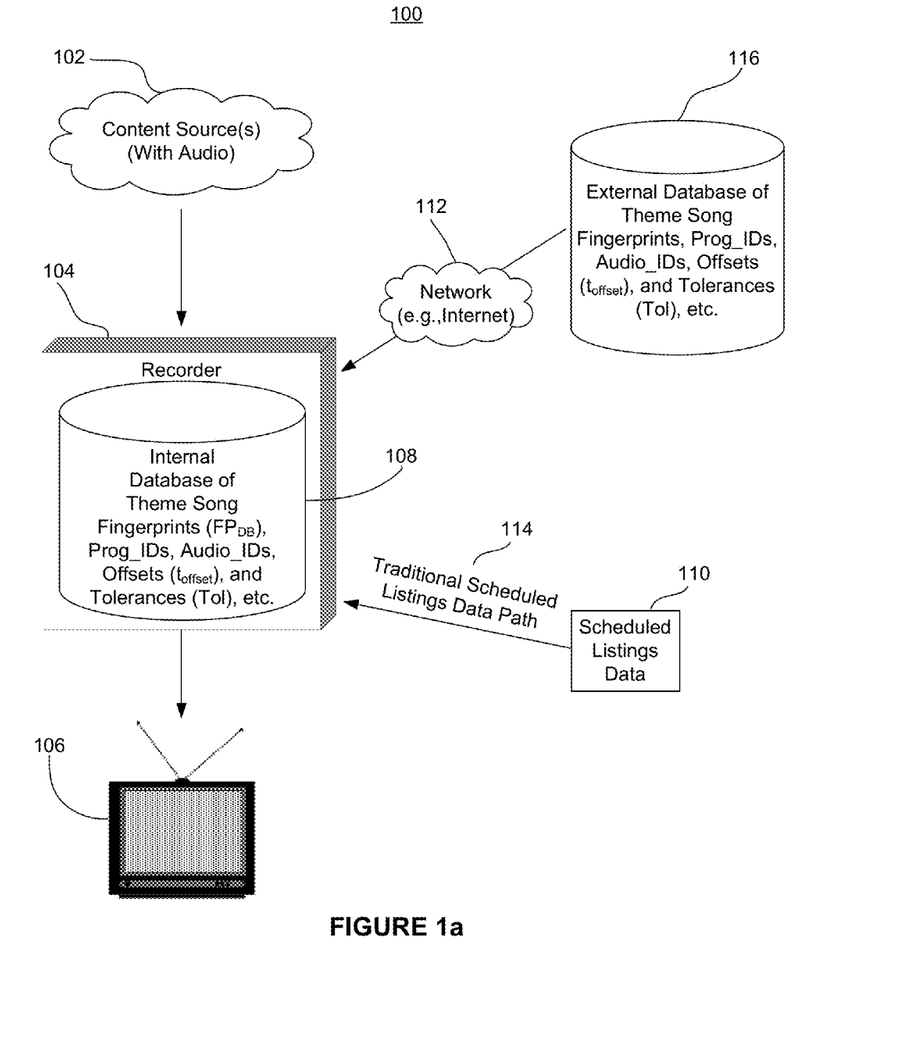
FIG. 1a is a system diagram of an exemplary digital video recorder timing adjustment system 100 in which some embodiments are implemented.

FIG. 1a is a system diagram of an exemplary recorder timing adjustment system 100 in which some embodiments are implemented. As shown in FIG. 1a, the system 100 includes at least one content source 102 that provides multimedia content, such as a television program or other program containing both video and audio content, to a recorder 104. In one embodiment, the recorder 104 comprises a digital video recorder (DVR). The content source 102 may include several different types such as, for example, cable, satellite, terrestrial, free-to-air, network and/or Internet.

The recorder 104 records multimedia content in a digital format to a disk drive or to any other suitable digital storage device. As shown in FIG. 1a, the recorder 104 is communicatively coupled to a user device 106, such as a television, an audio device, a video device, and/or another type of user and/or CE device, and outputs the multimedia content to the user device 106 upon receiving the appropriate instructions from a suitable user input device (not shown), such as a remote control device or buttons located on the recorder 104 itself.

The user device 106 receives the multimedia content from the recorder 104, and presents the multimedia content to a user. The user controls the operation of the user device 106 via a suitable user input device, such as buttons located on the user device 106 itself or on a remote control device (not shown). In one embodiment, a single remote control device may enable the user to control both the user device 106 and the recorder 104. The multimedia content recorded onto the recorder 104 is preferably viewed and/or heard by the user at a time chosen by the user.

It should be understood that the recorder 104 may be located in close proximity to a user device 106, or may exist in a remote location, such as on a server of a multimedia content provider. In either case, the recorder 104 operates in a substantially similar manner. An example network on which the recorder 104 may reside is described below in connection with FIG. 1b.

The recorder 104 periodically receives scheduled listings data 110 via a traditional scheduled listings data path 114, which can be any network, such as a proprietary network or the Internet. The recorder 104 stores the received scheduled listings data 110 in a suitable digital storage device (not shown). The scheduled listings data 110, which are typically provided by a multimedia content provider, include schedule information corresponding to specific multimedia programs, such as television programs. In particular, for each multimedia program scheduled for broadcast, the scheduled listings data 110 indicate a corresponding program identifier (Prog_ID), a scheduled program start time ($t_{sched\_prog\_start}$), scheduled program end time ($t_{sced\_prog\_end}$), and scheduled channel. The scheduled listings data 110 typically are used in conjunction with EPG data, which, as discussed above, are used to provide a digital guide for scheduled broadcast television. The digital guide allows a user to navigate, select, discover, and schedule recordings of content by time, title, channel, genre, etc., by use of a remote control, a keyboard, or other similar input device.

As shown in FIG. 1a, the recorder 104 also includes an internal database 108, which stores theme song data for theme songs predetermined as being associated with particular multimedia programs. In one example embodiment, the database 108 stores, in association with each individual multimedia program, a corresponding program identifier (Prog_ID), an audio identifier (Audio_ID), a theme song fingerprint, an expected theme song time offset ($t_{offset}$), and a theme song tolerance (Tol). The program identifier is an identifier unique to each specific multimedia program, and typically is received as part of the scheduled listings data 110. The audio identifier (Audio_ID) is an identifier unique to a specific portion of audio content, such as a specific theme song for a television program. The theme song fingerprint is an audio fingerprint that also corresponds to a specific portion of audio content. As discussed above, the audio fingerprint can be used to identify an audio sample and/or quickly locate similar items in an audio database. The expected theme song time offset ($t_{offset}$) is an expected amount of time between a scheduled program start time ($t_{sched\_prog\_start}$) of a particular program and an expected theme song start time ($t_{exp\_ts\_start}$), as shown in equation 1:

$$t_{offset} = t_{exp\_ts\_start} - t_{sched\_prog\_start} \quad (1)$$

The theme song tolerance (Tol), which may also be referred to herein as the tolerance, is an adjustment factor, that is, an amount of time that is factored into modifying a recording start time and a recording end time so as to provide to the recorder 104 with some recording time leeway or buffer. By using a large enough tolerance, the recorder 104 can avoid failing to record a leading and/or trailing portion of the program. The tolerance is set to be minimal so as not to include too much of a preceding or subsequent program in a scheduled recording.

It should be understood that, although FIG. 1a shows the database 108 as being internal with respect to the recorder 104, embodiments including an internal database, an external database, or both are contemplated and are within the scope of the present invention.

In one embodiment, an external database 116 is located on a server remote from the recorder 104, and communicates with the recorder 104 via a suitable network 112, such as a proprietary network or the Internet. In this way, as new theme song data is generated and/or discovered, the internal database 108 can be updated by receiving the data from the external database 116 over the network 112. For example, if a new multimedia program is scheduled to appear in an upcoming season, new corresponding theme song data can be generated, stored in the external database 116, and downloaded to the internal database 108 before the new program is ever broadcasted.

Internal database 108 and/or the external database 116 may also be divided into multiple distinct databases and still be within the scope of the present invention. For example, the internal database 108 may be divided based on the type of data being stored by generating a database for storing theme song footprints, a database for storing expected theme song time offsets ($t_{offset}$), etc.

Upon a multimedia program recording being scheduled, the recorder 104 tunes, based on received scheduled listings data 110, to the channel at a predetermined amount of time prior to the scheduled program start time ($t_{sched\_prog\_start}$) and captures a portion of audio content received from the content source 102. The recorder 104 performs an algorithm to generate an audio fingerprint (FP) for the captured portion of audio content.

Preferably, only a subset of the captured portion of audio content is used to generate the fingerprint (FP). In one example, a fingerprinting procedure is executed by a processor on encoded or compressed audio data which has been converted into a stereo pulse code modulated (PCM) audio stream. Pulse code modulation is a format by which many consumer electronic products operate and internally compress and/or uncompress audio data. Embodiments of the invention are advantageously performed on any type of audio data file or stream, and therefore are not limited to operations on PCM formatted audio streams. Accordingly, any memory size, number of frames, sampling rates, time, and the like, used to perform audio fingerprinting are within the scope of the present invention.

As described in more detail below with respect to FIGS. 3 and 4, the generated audio fingerprint (FP) for the captured portion of audio content is compared by the recorder 104 to the data in the database 108 to determine a known theme song and/or a multimedia program to which the portion of audio content corresponds. If the portion of audio content corresponds to a theme song of the program to be recorded, the recorder 104 performs an algorithm that uses, among other things, the time at which the captured portion of audio content occurred, and the scheduled listings data 110, to determine whether the program is running on-schedule. If the program is not running on-schedule, the recorder 104 determines whether and how to modify the start recording time and end recording time to compensate for the delayed program. The recorder 104 records the program by using the modified start and end recording times and further enables the user to view and/or hear the program at a time chosen by the user.

Figure 1B:
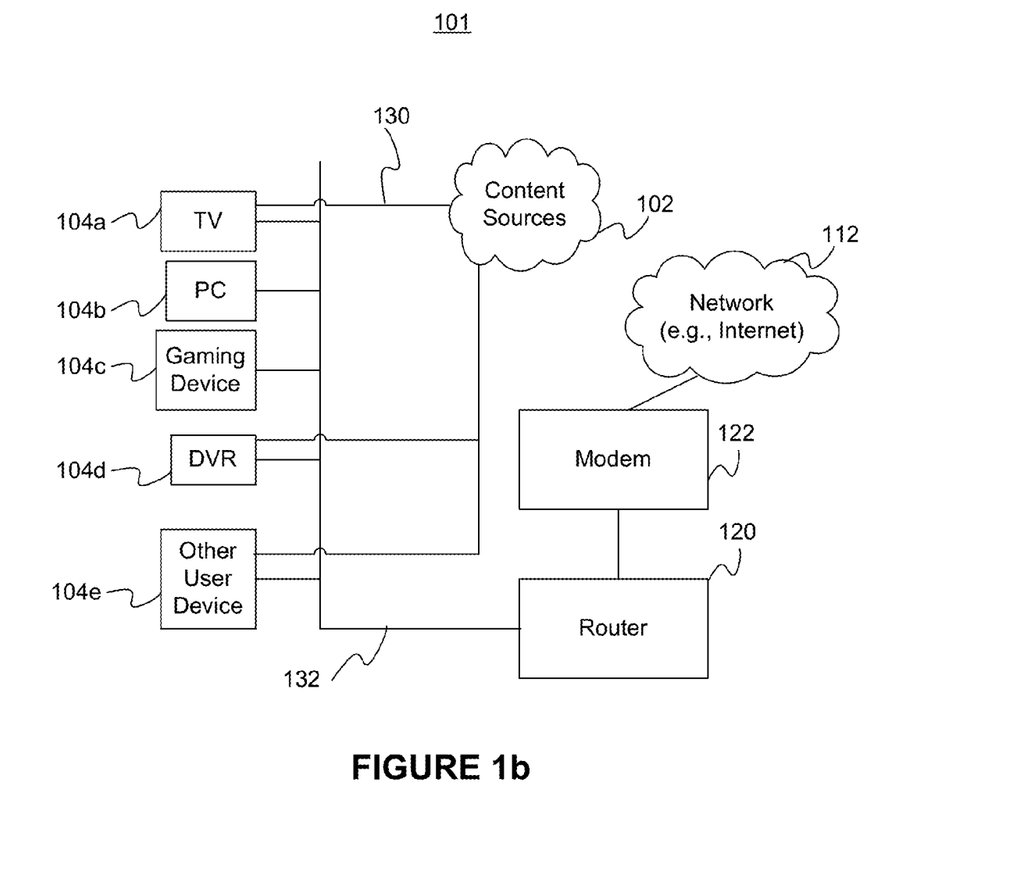
FIG. 1b is a block diagram of an example home network in which some embodiments are implemented.

FIG. 1b is a block diagram of a network 101, in which some embodiments are implemented. The network 101 may include a home media type network, for instance. On the network 101, may be a variety of user devices, such as a network ready television 104a, a personal computer 104b, a gaming device 104c, a digital video recorder 104d, other devices 104e, and the like. The user devices 104a-104e may receive multimedia content from content sources 102 through multimedia signal lines 130, through an input interface such as the input interface 208 described below in connection with FIG. 2. In addition, user devices 104a-104e may communicate with each other through a wired or wireless router 120 via network connections 132, such as Ethernet connections. The router 120 couples the user devices 104a-104e to the network 112, such as the Internet, through a modem 122. In an alternative embodiment, content sources 102 are delivered from the network 112.

Figure 2:
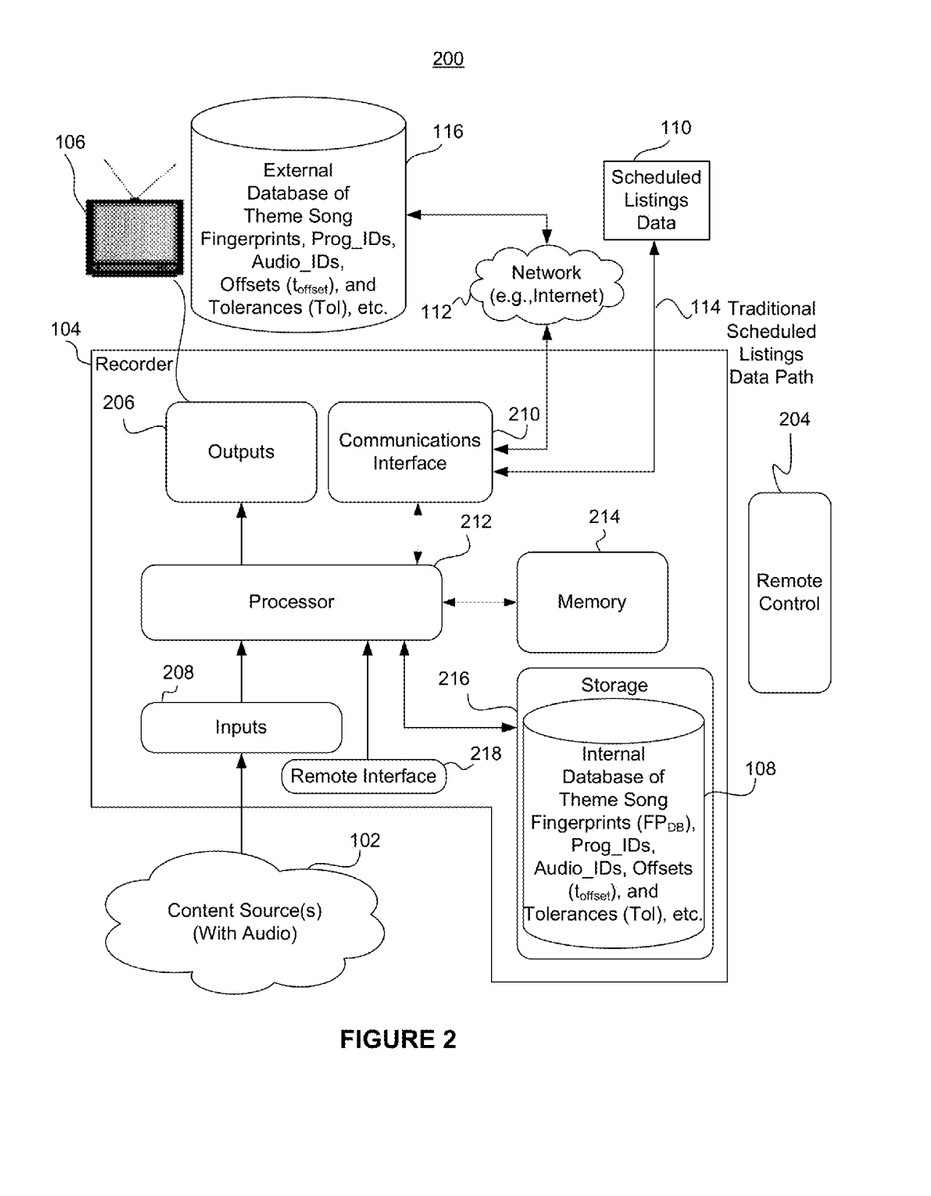
FIG. 2 is a block diagram of an exemplary digital video recorder.

FIG. 2 illustrates a system 200 that includes a more detailed diagram of the recorder 104 of some embodiments. Within the system 200 of FIG. 2, the exemplary recorder 104 includes a processor 212 which is coupled through a communication infrastructure (not shown) to an output interface 206, a communications interface 210, a memory 214, a storage device 216, a remote control interface 218, and an input interface 208.

The input interface 208 receives content such as in the form of audio and video streams from the content source(s) 102, which communicate, for example, through an HDMI (High-Definition Multimedia Interface), Radio Frequency (RF) coaxial cable, composite video, S-Video, SCART, component video, D-Terminal, VGA, and the like, with the recorder 104.

In the example shown in FIG. 2, content signals, such as audio and video, received by the input interface 208 from the content source(s) 102 are communicated to the processor 212 for further processing. The processor 212 performs audio fingerprinting on at least a subset of the audio portion of the received content to determine the appropriate adjustments to make to the start recording times and/or the end recording times.

The recorder 104 also includes a main memory 214. Preferably, the main memory 214 is random access memory (RAM). The recorder 104 also includes a storage device 216. The database 108, which, as described above, stores theme song data, is preferably included in the storage device 216. The storage device 216 (also sometimes referred to as "secondary memory") may also include, for example, a hard disk drive and/or a removable storage drive, representing a disk drive, a magnetic tape drive, an optical disk drive, etc. As will be appreciated, the storage device 216 may include a computer-readable storage medium having stored thereon computer software and/or data.

In alternative embodiments, the storage device 216 may include other similar devices for allowing computer programs or other instructions to be loaded into the recorder 104. Such devices may include, for example, a removable storage unit and an interface, a program cartridge and cartridge interface such as that found in video game devices, a removable memory chip such as an erasable programmable read only memory (EPROM), or programmable read only memory (PROM) and associated socket, and other removable storage units and interfaces, which allow software and data to be transferred from the removable storage unit to the recorder 104.

The recorder 104 includes the communications interface 210 to provide connectivity to a network 112, such as a proprietary network or the Internet. The communications interface 210 also allows software and data to be transferred between the recorder 104 and external devices. Examples of the communications interface 210 may include a modem, a network interface such as an Ethernet card, a communications port, a Personal Computer Memory Card International Association (PCMCIA) slot and card, etc. Software and data transferred via the communications interface 210 are in the form of signals which may be electronic, electromagnetic, optical, or other signals capable of being received by the communications interface 210. These signals are provided to and/or from the communications interface 210 via a communications path, such as a channel. This channel carries signals and may be implemented by using wire, cable, fiber optics, a telephone line, a cellular link, an RF link, and/or other suitable communications channels.

In one embodiment, the communications interface 210 provides connectivity between the recorder 104 and the external database 116 via the network 112. The communications interface 210 also provides connectivity between the recorder 104 and the scheduled listings data 110 via the traditional scheduled listings data path 114. The network 112 preferably includes a proprietary network and/or the Internet.

A remote control interface 218 decodes signals received from a remote control 204, such as a television remote control or other user input device, and communicates the decoded signals to the processor 212. The decoded signals, in turn, are translated and processed by the processor 212.

Figure 3:
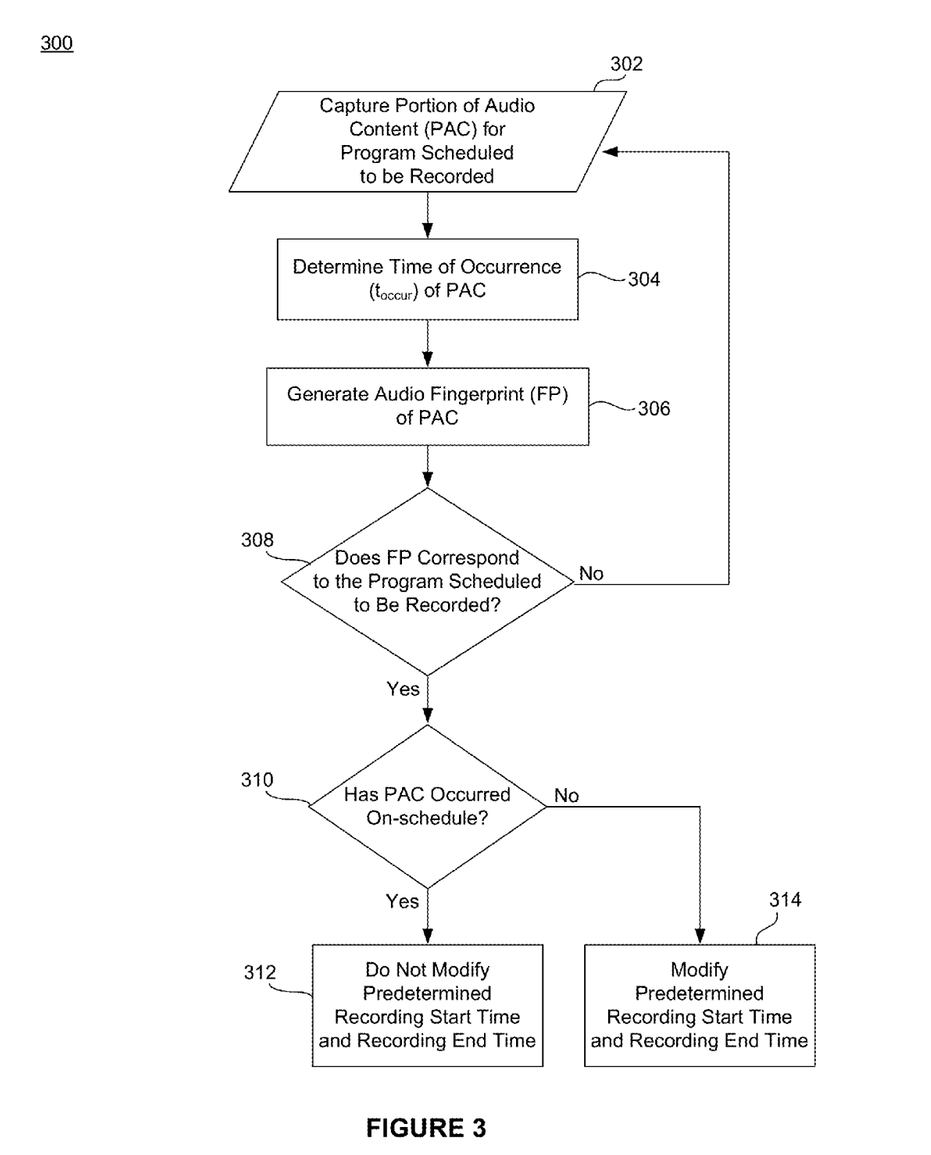
FIG. 3 is a flowchart diagram showing an exemplary procedure for modifying the timing of a content recorder in accordance with an embodiment.

FIG. 3 is a flowchart diagram showing an exemplary procedure 300 for modifying the timing of a content recorder in accordance with an embodiment. Referring to FIGS. 1a, 1b, 2, and 3, initially, at block 302, the recorder 104 captures a portion of audio content (PAC) for a program scheduled to be recorded from one or more content source(s) 102. At block 304, the recorder 104 determines a time of occurrence ($t_{occur}$) for the captured portion of audio content. The time of occurrence ($t_{occur}$) may be determined in different ways. For example, the time of occurrence ($t_{occur}$) may be determined based on time data indicated by a system clock (not shown) within the recorder 104, time data obtained by the recorder 104 via the network 112 from an Internet-based time provider, or time data from any other suitable timing mechanism. The time of occurrence ($t_{occur}$) is stored in the recorder 104 as a timestamp associated with the captured portion of audio content. This information is used to indicate a start time, a stop time, and/or a duration of the captured portion of audio content.

At block 306, the recorder 104 generates an audio fingerprint (FP) for the captured portion of audio content. Generation of audio fingerprints is described in further detail below, with reference to FIG. 4. At block 308, the recorder 104 determines whether the captured portion of audio content corresponds to the program scheduled to be recorded. In particular, the recorder 104 determines whether the generated audio fingerprint (FP) of the captured portion of audio content matches a known audio fingerprint ($FP_{DB}$) stored in the database 108 in association with the program scheduled to be recorded. If the recorder 104 determines that the generated audio fingerprint (FP) of the captured portion of audio content does not match the known audio fingerprint ($FP_{DB}$) then the process 300 returns to block 302 to capture another portion of audio content. If the recorder 104 determines that the generated audio fingerprint (FP) of the portion of audio content does match the known audio fingerprint ($FP_{DB}$) then the process 300 progresses to block 310.

At block 310, the recorder 104 determines whether the captured portion of audio content has occurred on-schedule by determining whether the time of occurrence ($t_{occur}$) for the captured portion of audio content matches an expected time of occurrence ($t_{offset}$) stored in the database 108 in association with the known audio fingerprint ($FP_{DB}$) matched in block 308. If the recorder 104 determines that the captured portion of audio content has occurred on-schedule, then the process 300 progresses to block 312. At block 312, the recorder 104 does not modify, but instead retains, a predetermined recording start time and a predetermined recording end time based on the scheduled listings data 110. In particular, the predetermined recording start time and the predetermined recording end time are based on a scheduled program start time and a scheduled program end time, respectively, as indicated by the scheduled listings data 110. The recorder 104 then records the program according to the predetermined recording start time and the predetermined recording end time.

If, on the other hand, the recorder 104 determines at block 310 that the captured portion of audio content has occurred off-schedule, then the process 300 progresses to block 314. At block 314, the recorder 104 modifies the predetermined recording start time and the predetermined recording end time according to one or more predetermined algorithms. The recorder 104 then records the program according to the modified recording start time and the modified recording end time.

Figure 4:
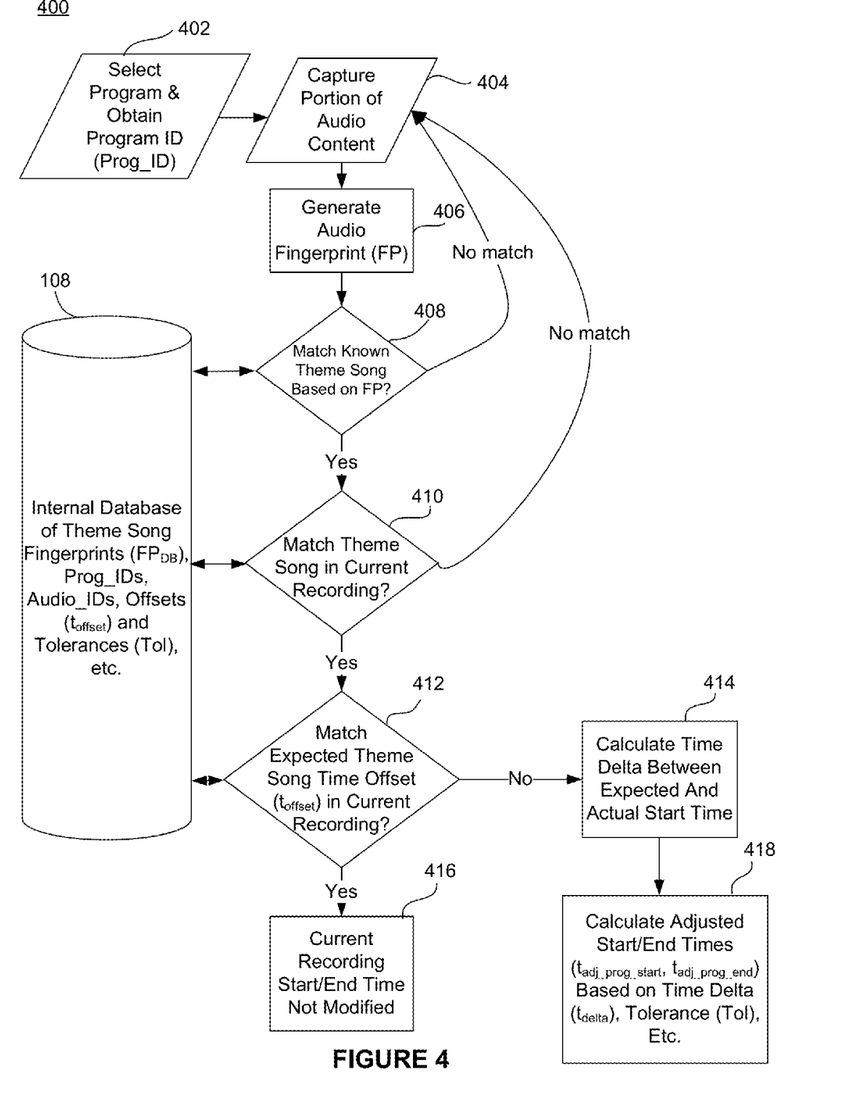
FIG. 4 is a flowchart diagram showing an exemplary procedure for adjusting digital video recorder timing in accordance with another embodiment of the present invention.

FIG. 4 is a flowchart diagram showing an exemplary procedure 400 for adjusting recorder timing in accordance with another embodiment of the present invention. Referring to FIGS. 1a, 1b, 2, and 4, initially, the recorder 104 receives a command to record a scheduled multimedia program from, for example, the remote control 204. In one embodiment, at block 402, the user selects the scheduled program for recording by using a digital guide displayed on the user device 106 to select a program identifier (Prog_ID) corresponding to the multimedia program. The recorder 104 retrieves the scheduled listings data 110 corresponding to the program identifier (Prog_ID), including a scheduled program start time ($t_{sched\_prog\_start}$), a scheduled program end time ($t_{sced\_prog\_end}$), and a channel for the scheduled program. At a predetermined time before the scheduled program start time ($t_{sched\_prog\_start}$), the processor 212 controls a tuner (not shown) to tune to the appropriate channel, and begins recording multimedia content in anticipation of the scheduled program beginning. The predetermined time may be optimized based on, for example, an average of previous program start time occurrences, so as to ensure capture of the beginning of the program while minimizing the undesired recording of a preceding scheduled program. The predetermined time may be optimized based on other statistics as well. For example, the predetermined time may be based on the standard deviation of previous start time occurrences for the particular program.

At block 404, the input interface 208 captures a portion of audio content received from the content source(s) 102, and feeds the captured audio content, such as a PCM audio stream, to a processor 212. The input interface 208 also records the time of occurrence of the captured audio content, that is, the time and/or time range during which the portion of audio content is captured. At block 406, the processor 212 performs an audio recognition process on the captured audio content. Particularly, the processor 212 analyzes the captured audio content to generate a corresponding audio fingerprint (FP).

Different audio fingerprinting algorithms may be executed by the processor 212 to generate audio fingerprints and that the audio fingerprints may be different. Two exemplary audio fingerprinting algorithms are described in U.S. Pat. No. 7,451,078, entitled "Methods and Apparatus for Identifying Media Objects," filed Dec. 30, 2004, and U.S. Pat. No. 7,277,766, entitled "Method and System for Analyzing Digital Audio Files," filed Oct. 24, 2000, both of which are hereby incorporated by reference herein in their entirety. Similarly, instead of audio fingerprinting, captured audio or other audio identification techniques can be used. For example, a watermark embedded into the audio stream or a tag inserted in the audio stream may be used as an identifier.

At block 408, once an audio fingerprint (FP) or other identifier has been generated for the captured audio content, the processor 212 performs a lookup in the database 108 for an audio identifier (Audio_ID), such as a theme song identifier, associated with the portion of audio content based on the audio fingerprint (FP). Particularly, the processor 212 compares the generated audio fingerprint (FP) to the theme song fingerprints stored in the database 108 to determine whether the captured portion of audio content corresponds to a known theme song. This comparison may include performing one or more fuzzy searches, which are described in further detail above.

If the processor 212 determines that no theme song fingerprint in the database 108 matches the audio fingerprint (FP) of the captured audio content, then the process returns to block 404 to capture another portion of audio content. The same procedure discussed above may be performed until the portion of audio content is recognized.

In some cases, it is desirable to capture additional audio content from the content source 102. For example, the audio fingerprint may not be sufficiently robust to be matched to an audio identifier (Audio_ID). Various reasons may be the cause of this. One example is that audio content was mixed with voice-over or sound effects noises in a received multimedia content stream.

To avoid, as best as possible, an inconclusive or erroneous result, additional audio content is preferably captured. This provides the processor 212 with more audio information, resulting in a more robust audio fingerprint. In some cases, multiple fingerprints are associated with the audio content. Alternatively, the additional audio content is extracted from memory 214 or storage 216 if the audio stream has been buffered. The processor 212 performs audio recognition on the additional information. Particularly, the additional audio information may be added to the audio information previously captured, to make the total captured segment longer. Alternatively, a different start and stop time within the captured portion of audio content, within a song for example, may be used to generate the audio fingerprint. In yet another embodiment, the processor 212 is programmed to adjust the total audio capture time.

By capturing additional data, different fingerprints may be generated for the same portion of audio content or subset of the portion of audio content. Different fingerprints may be generated based on the length of the captured segment or based on the location within the audio stream at which the audio capturing took place.

Referring back to block 408, if the processor 212 determines that the audio fingerprint (FP) of the captured audio content matches a theme song fingerprint stored in the database 108, then it obtains from the database 108 an audio identifier (Audio_ID) associated with the theme song fingerprint, then the process 400 progresses to block 410.

At block 410, the processor 212 compares the audio identifier (Audio_ID) obtained in block 408 to all the audio identifiers associated with the program identifier (Prog_ID) of the program to be recorded. The audio identifiers that are associated with the program identifier (Prog_ID) also are stored in the database 108. In this way, the processor 212 determines whether the captured audio content corresponds to the program scheduled to be recorded. This comparison may include performing one or more fuzzy searches, which are described in further detail above. If the processor 212 determines that the audio fingerprint (FP) of the captured audio content does not correspond to the program scheduled to be recorded, then the process 400 returns to block 404 to capture another portion of audio content, as discussed above. In this case, the processor 212 may determine that a program different from the program scheduled to be recorded is being broadcasted. In one embodiment, the processor 212 uses this information to validate scheduled listings data 110, as described in further detail below.

If the processor 212 determines that the audio fingerprint (FP) of the captured audio content corresponds to the program scheduled to be recorded, then the process 400 progresses to block 412. At block 412, the processor 212 retrieves from the database 108 the expected theme song time offset ($t_{offset}$) of the theme song to which the captured portion of audio content was matched. As described above with reference to equation 1, the expected theme song time offset ($t_{offset}$) is the expected time into the beginning of the program that the theme song is expected to occur. For example, the expected theme song time offset ($t_{offset}$) may be zero if the theme song begins at the same time as the show begins. Alternatively, the expected theme song time offset ($t_{offset}$) may be a nonzero number if the theme occurs, for example, four minutes after the program begins. The expected theme song time offset ($t_{offset}$) can be computed based on the statistics of previous shows or based on editorially generated timings. For example, the expected theme song time offset ($t_{offset}$) may be an average of the theme song time offsets ($t_{offset}$) of previous shows. The expected theme song time offset ($t_{offset}$) preferably is not a single time, but rather is a range of times to account for variations in the occurrence time of the theme song, as well as variations in the time the portion of the theme song is captured.

The processor 212 compares the occurrence time of the captured audio content to the scheduled program start time ($t_{sched\_prog\_start}$), taking into account the expected theme song time offset ($t_{offset}$) and the theme song tolerance (Tol) stored in the database 108, to determine whether the theme song is occurring on-schedule. Particularly, the processor 212 computes an expected theme song start time ($t_{exp\_ts\_start}$) based on the sum of the scheduled program start time ($t_{sched\_prog\_start}$), the expected theme song time offset ($t_{offset}$), and the theme song tolerance (Tol). A predetermined threshold or window may be used such that if the actual theme song start time ($t_{actual\_ts\_start}$) exceeds the threshold or window, then the program is deemed to be occurring off-schedule. Similarly, if the actual theme song start time ($t_{actual\_ts\_start}$) is below the threshold or window, then the program is deemed to be occurring on-schedule.

If the processor 212 determines that the theme song is occurring on-schedule, then the process 400 progresses to block 416. At block 416, the processor 212 uses the scheduled program start time ($t_{sched\_prog\_start}$) and scheduled program end time ($t_{sced\_prog\_end}$) for recording the scheduled program. In other words, the processor 212 does not modify the start and stop recording times retrieved from the scheduled listings data 110.

If the processor 212 determines that the theme song is occurring off-schedule, then the process 400 progresses to block 414. At block 414, the processor 212 calculates a time delta ($t_{delta}$) between the scheduled program start time ($t_{sched\_prog\_start}$) and the actual program start time ($t_{actual\_prog\_start}$). This time delta ($t_{delta}$) is calculated as the difference between the occurrence time of the captured audio content and the expected theme song time offset ($t_{offset}$). Once the time delta ($t_{delta}$) is calculated, the process 400 progresses to block 418.

At block 418, the processor 212 calculates an adjusted program start time ($t_{adj\_prog\_start}$) and an adjusted program end time ($t_{adj\_prog\_end}$), respectively, by using the following equations:

$$t_{adj\_prog\_start} = t_{sched\_prog\_start} + \left(t_{delta} - \frac{Tol}{Start\_Tol\_Factor}\right) \quad (2)$$

$$t_{adj\_prog\_end} = t_{sched\_prog\_end} + \left(t_{delta} + \frac{Tol}{End\_Tol\_Factor}\right) \quad (3)$$

The tolerance (Tol) shown in equations (2) and (3), represents a predetermined amount of time to provide a temporal leeway ensuring that the entire program is recorded, including the actual program start time ($t_{actual\_prog\_start}$) and the actual program end time ($t_{actual\_prog\_end}$). For example, if the program is scheduled to run for one hour, and the expected theme song time offset ($t_{offset}$) is four minutes, then the tolerance (Tol) may be ten seconds. The tolerance (Tol), the start tolerance factor (Start_Tol_Factor), and/or the end tolerance factor (End_Tol_Factor) may each be based on statistics of start times and/or end times of previous occurrences of a particular program. For example, the start tolerance factor (Start_Tol_Factor) may be the standard deviation of previous theme song time offsets ($t_{offset}$).

Instead of using the scheduled program start time ($t_{sched\_prog\_start}$), the recorder 104 uses the adjusted program start time ($t_{adj\_prog\_start}$), as calculated above, to record the program into the storage device 216. Particularly, the processor 212 begins recording the program at a predetermined time before the scheduled program start time ($t_{sched\_prog\_start}$), and then the processor 212 erases the run over, or recording time "overrun," of the previous program off of the beginning of the recording. In other words, the processor 212 erases the programming recorded from the beginning of the recording up to the adjusted program start time ($t_{adj\_prog\_start}$) calculated above. This increases convenience for the user, by eliminating the need to fast forward through the previous program overlap to view the desired program. Also, by erasing the recording time overrun of undesired programs, the recorder 104 conserves more storage space in the storage device 216 for storing desired programs. Thus, the recorder 104 maximizes the use of storage space in the storage device 216.

Instead of using the scheduled program end time ($t_{sched\_prog\_end}$), which would result in the recorder 104 failing to record an end portion of the program, the recorder 104 uses the adjusted program end time ($t_{adj\_prog\_end}$), as calculated above, to record the program into the storage device 216. In this way, the entire program is recorded, not just a beginning portion of the program.

Although not shown, in an alternative embodiment, the processor 212 switches to a more robust algorithm of capturing portions of audio content upon detecting that a program is potentially running behind-schedule. For example, the processor 212 captures larger portions of audio content and/or captures audio content more frequently to ensure that the processor 212 detects the actual beginning of the program to be recorded. Using a more robust algorithm also increases the accuracy of the time of occurrence of the captured audio content and thus the accuracy of the time delta ($t_{delta}$) calculation.

In another alternative embodiment, the recorder 104 is used to validate the scheduled listings data 110. One or more processors 212 continually capture portions of audio content on one or more channels simultaneously to generate audio fingerprints for each portion of audio content. The one or more processors 212 then perform lookups of audio identifiers (Audio_ID) stored in the database 108 based on the generated audio fingerprints. Particularly, the one or more processors 212 compare the generated audio fingerprints to the known theme song fingerprints in the database 108 to determine whether the portions of audio content correspond to known theme songs. The one or more processors 212 then compare the occurrences of the detected theme songs to the scheduled listings data 110 to determine any discrepancies. The recorder 104 reports the discrepancies and/or modifies the scheduled listings data 110 according to the discrepancies.

In yet another alternative embodiment, the recorder 104 is used to detect new programs. More particularly, the processor 212 looks up a program listed in the scheduled listings data 110, generates audio fingerprints for successive occurrences of the program, and uses the generated audio fingerprints to develop a theme song fingerprint for the program.

Figure 5:
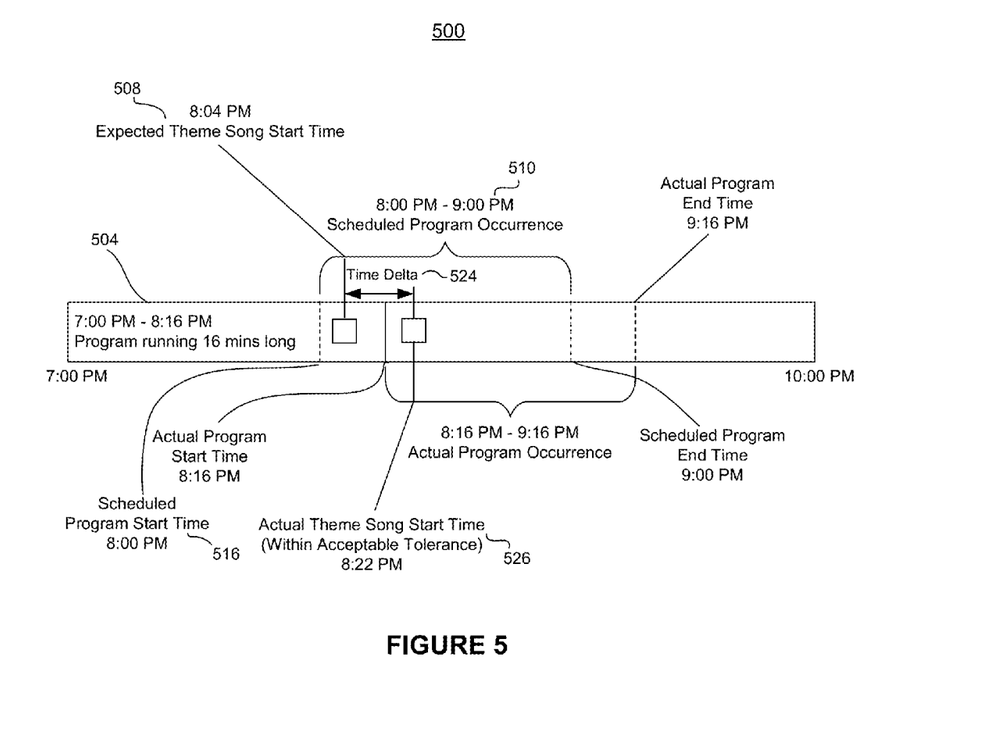
FIG. 5 is a diagram of an exemplary timeline of a digital video recording in accordance with an embodiment of the invention.

FIG. 5 is a diagram of an exemplary timeline 500 of a digital video recording in accordance with an embodiment of the invention. In this example, FIG. 5 indicates a timeline of a single channel of a multimedia transmission from 7:00 PM to 10:00 PM. With reference to FIGS. 1a, 1b, and 5, the recorder 104 is configured to record a scheduled program occurrence 510 that is scheduled for transmission and/or reception on the channel from 8:00 PM to 9:00 PM. The preceding program 504, however, is running 16 minutes long, or has a time overrun of about 16 minutes. Unless the start recording time and the end recording time of the recorder 104 are modified, the recording will undesirably include the final 16 minutes of the preceding program 504 and will further undesirably miss the final 16 minutes of the program intended to be recorded. As described above with respect to FIG. 4, at a predetermined time before 8:00 PM, the processor 212 tunes to the channel and begins recording in anticipation of the beginning of the desired program. The input interface 208 successively captures portions of audio content received from the content source(s) 102 and compares the captured portions of audio content to the audio identifiers (Audio_ID) stored in the database 108 until the theme song occurrence is detected, which occurs in FIG. 5 at 8:22 PM.

The processor 212 retrieves from the database 108 the expected theme song time offset ($t_{offset}$) of the theme song to which the captured portion of audio content was matched. In this example, the expected theme song time offset ($t_{offset}$) is four minutes, as apparent from the difference between the expected theme song start time 508 ($t_{exp\_ts\_start}$=8:04 PM) and the scheduled program start time 516 ($t_{sched\_prog\_start}$=8:00 PM). The processor 212 compares the actual theme song start time 526 ($t_{actual\_ts\_start}$=8:22 PM) to the expected theme song time offset ($t_{offset}$=4 minutes) stored in the database 108, determining that the theme song has occurred behind-schedule.

The processor 212 calculates a time delta 524 ($t_{delta}$) as the difference between the actual theme song start time 526 ($t_{actual\_ts\_start}$=8:22 PM) and the expected theme song start time 508 ($t_{exp\_ts\_start}$=8:04 PM). In this example, the time delta 524 ($t_{delta}$) equals 18 minutes (the difference between 8:22 PM and 8:04 PM).

The processor 212 then calculates an adjusted program start time ($t_{adj\_prog\_start}$) and an adjusted program end time ($t_{adj\_prog\_end}$), respectively by using equations (2) and (3). In this example, a tolerance (Tol) of four minutes is used and both the start tolerance factor (Start_Tol_Factor) and the end tolerance factor (End_Tol_Factor) equal one. Applying equations (2) and (3) to the example of FIG. 5 yields:

$$t_{adj\_prog\_start} = 8:00 \text{ PM} + \left(18 \text{ minutes} - \frac{4 \text{ minutes}}{1}\right) = 8:14:00 \text{ PM} \quad (4)$$

$$t_{adj\_prog\_end} = 9:00 \text{ PM} + \left(18 \text{ minutes} + \frac{4 \text{ minutes}}{1}\right) = 9:22:00 \text{ PM} \quad (5)$$

The recorder 104 then uses the adjusted program start time ($t_{adj\_prog\_start}$=8:14:00 PM) and the adjusted program end time ($t_{adj\_prog\_end}$=9:22:00 PM), as calculated above, to record the program into the storage device 216. Particularly, the processor 212 begins recording the program at a predetermined time before the scheduled program start time 516 ($t_{sched\_prog\_start}$=8:00 PM), and then the processor 212 erases the programming that was recorded prior to 8:14:00 PM. The recorder 104 continues to record the program until 9:22:00 PM.

Exemplary Computer Readable Medium Implementation

The example embodiments described above such as, for example, the systems 100, 200, the procedures 300, 400, the timeline 500, or any part(s) or function(s) thereof, may be implemented by using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary in any of the operations described herein. For example, the recorder 104 may automatically record programs without a viewer's input through the remote control 204. In other words, the operations may be completely implemented with machine operations. Useful machines for performing the operation of the example embodiments presented herein include general purpose digital computers or similar devices.

Figure 6:
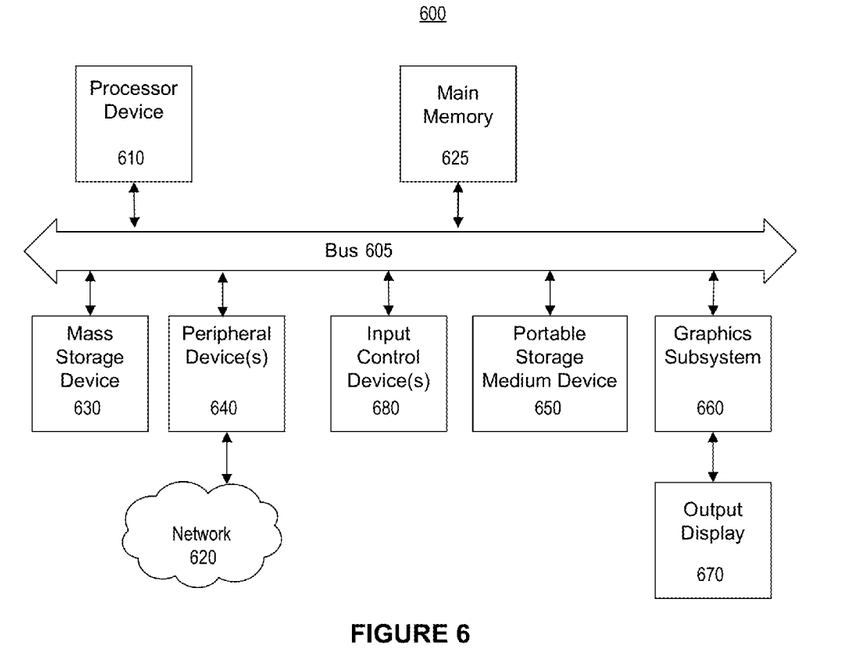
FIG. 6 is a block diagram of a general and/or special purpose computer system, in accordance with some embodiments.

FIG. 6 is a high-level block diagram of a general and/or special purpose computer system 600, in accordance with some embodiments. The computer system 600 may be, for example, a user device, a user computer, a client computer and/or a server computer, among other things.

The computer system 600 preferably includes without limitation a processor device 610, a main memory 625, and an interconnect bus 605. The processor device 610 may include without limitation a single microprocessor, or may include a plurality of microprocessors for configuring the computer system 600 as a multi-processor system. The main memory 625 stores, among other things, instructions and/or data for execution by the processor device 610. If the system is partially implemented in software, the main memory 625 stores the executable code when in operation. The main memory 625 may include banks of dynamic random access memory (DRAM), as well as cache memory.

The computer system 600 may further include a mass storage device 630, peripheral device(s) 640, portable storage medium device(s) 650, input control device(s) 680, a graphics subsystem 660, and/or an output display 670. For explanatory purposes, all components in the computer system 600 are shown in FIG. 6 as being coupled via the bus 605. However, the computer system 600 is not so limited. Devices of the computer system 600 may be coupled through one or more data transport means. For example, the processor device 610 and/or the main memory 625 may be coupled via a local microprocessor bus. The mass storage device 630, peripheral device(s) 640, portable storage medium device(s) 650, and/or graphics subsystem 660 may be coupled via one or more input/output (I/O) buses. The mass storage device 630 is preferably a nonvolatile storage device for storing data and/or instructions for use by the processor device 610. The mass storage device 630 may be implemented, for example, with a magnetic disk drive or an optical disk drive. In a software embodiment, the mass storage device 630 is preferably configured for loading contents of the mass storage device 630 into the main memory 625.

The portable storage medium device 650 operates in conjunction with a nonvolatile portable storage medium, such as, for example, a compact disc read only memory (CD-ROM), to input and output data and code to and from the computer system 600. In some embodiments, the software for storing an internal identifier in metadata may be stored on a portable storage medium, and may be inputted into the computer system 600 via the portable storage medium device 650. The peripheral device(s) 640 may include any type of computer support device, such as, for example, an input/output (I/O) interface configured to add additional functionality to the computer system 600. For example, the peripheral device(s) 640 may include a network interface card for interfacing the computer system 600 with a network 620.

The input control device(s) 680 provide a portion of the user interface for a user of the computer system 600. The input control device(s) 680 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the computer system 600 preferably includes the graphics subsystem 660 and the output display 670. The output display 670 may include a cathode ray tube (CRT) display and/or a liquid crystal display (LCD). The graphics subsystem 660 receives textual and graphical information, and processes the information for output to the output display 670.

Each component of the computer system 600 may represent a broad category of a computer component of a general and/or special purpose computer. Components of the computer system 600 are not limited to the specific implementations provided here.

Portions of the invention may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the processes of the invention. The storage medium may include without limitation a floppy disk, a mini disk, an optical disc, a Blu-ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the invention. Such software may include without limitation device drivers, operating systems, and user applications. Ultimately, such computer readable media further includes software for performing aspects of the invention, as described above.

Included in the programming and/or software of the general and/or special purpose computer or microprocessor are software modules for implementing the processes described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A method for adjusting recorder timing by using audio identification, the method comprising:
   capturing a portion of audio content of a multimedia program from a network;
   generating an audio fingerprint based on the captured portion of audio content;
   matching the audio fingerprint to one of a plurality of theme song fingerprints stored in a database;
   retrieving, from the database, an expected theme song time offset associated with a matching theme song fingerprint;
   determining whether the multimedia program is running on-schedule based on the retrieved expected theme song time offset; and
   recording the multimedia program based on the determination of whether the multimedia program is running on-schedule.

2. The method of claim 1, wherein determining whether the multimedia program is running on-schedule further comprising:
   determining that a time of occurrence of a portion of audio content exceeds a predetermined threshold;
   calculating a time delta based at least in part on the time of occurrence of the portion of audio content and the expected theme song time offset;
   calculating at least one of an adjusted start time and an adjusted end time of the multimedia program based on the time delta; and
   recording, by a recorder, the multimedia program based on at least one of the adjusted start time and the adjusted end time.

3. The method according to claim 2, wherein the calculating at least one of the adjusted start time and the adjusted end time further includes calculating at least one of the adjusted start time and the adjusted end time based on at least one of a scheduled start time of the multimedia program, a scheduled end time of the multimedia program, an expected theme song time offset of the multimedia program, and a theme song tolerance of the multimedia program.

4. The method according to claim 3, further comprising:
   retrieving, from the database, at least one of the expected theme song time offset of the multimedia program and the theme song tolerance of the multimedia program.

5. The method according to claim 2, wherein at least one of the expected theme song time offset of the multimedia program, and the theme song tolerance of the multimedia program are computed based on statistics for a plurality of occurrences of the multimedia program.

6. The method according to claim 2, further comprising:
   erasing, by the recorder, data recorded from the scheduled start time of the multimedia program to minimize undesired recording time preceding the adjusted start time of the multimedia program.

7. The method of claim 1, wherein determining whether the multimedia program is running on-schedule further comprising:
   determining that a time of occurrence of a portion of audio content is below the predetermined threshold; and
   recording, by a recorder, the multimedia program based on at least one of a scheduled start time and a scheduled end time of the multimedia program.

8. The method according to claim 1, wherein the captured audio content is a portion of an episode of the multimedia program, and wherein a theme song of the multimedia program is included in each episode of the multimedia program.

9. The method according to claim 8, wherein the theme song plays during a title sequence of the episode.

10. The method according to claim 8, wherein the theme song plays during end credits of the episode.

11. The method according to claim 8, wherein the theme song occurs within an expected time offset window from the beginning of the episode.

12. A system for adjusting recorder timing by using audio identification, the system including at least one processor operable to:
   capture a portion of audio content of a multimedia program from a network;

generate an audio fingerprint based on the captured portion of audio content;

match the audio fingerprint to one of a plurality of theme song fingerprints stored in a database;

retrieve, from the database, an expected theme song time offset associated with a matching theme song fingerprint;

determine whether the multimedia program is running on-schedule based on the retrieved expected theme song time offset; and record the multimedia program based on the determination of whether the multimedia program is running on-schedule.

13. The system according to claim 12, wherein the processor operable to determine whether the multimedia program is running on-schedule is further operable to:

determine that a time of occurrence of a portion of audio content exceeds a predetermined threshold;

calculate a time delta based at least in part on the time of occurrence of the portion of audio content and the expected theme song time offset;

calculate at least one of an adjusted start time and an adjusted end time of the multimedia program based on the time delta; and record the multimedia program based on at least one of the adjusted start time and the adjusted end time.

14. The system according to claim 12, wherein the processor operable to determine whether the multimedia program is running on-schedule is further operable to:

determine that a time of occurrence of a portion of audio content is below a predetermined threshold; and record the multimedia program based on at least one of a scheduled start time and a scheduled end time of the multimedia program.

15. The system according to claim 13, wherein the processor is further operable to:

calculate at least one of the adjusted start time and the adjusted end time based on at least one of a scheduled start time of the multimedia program, a scheduled end time of the multimedia program, an expected theme song time offset of the multimedia program, and a theme song tolerance of the multimedia program.

16. The system according to claim 15, wherein the processor is further operable to:

retrieve, from the database, at least one of the expected theme song time offset of the multimedia program and the theme song tolerance of the multimedia program.

17. The system according to claim 13, wherein at least one of the expected theme song time offset of the multimedia program, and the theme song tolerance of the multimedia program are computed based on statistics of previous broadcasts of the multimedia program.

18. The system according to claim 13, wherein the processor is further operable to:

erase data recorded from the scheduled start time of the multimedia program to minimize undesired recording time preceding the adjusted start time of the multimedia program.

19. A non-transitory computer-readable medium having stored thereon sequences of instructions, the sequences of instructions including instructions, which, when executed by a processor, cause the processor to perform:

capturing a portion of audio content of a multimedia program from a network;

generating an audio fingerprint based on the captured portion of audio content;

matching the audio fingerprint to one of a plurality of theme song fingerprints stored in a database;

retrieving, from the database, an expected theme song time offset associated with a matching theme song fingerprint;

determining whether the multimedia program is running on-schedule based on the retrieved expected theme song time offset; and recording the multimedia program based on the determination of whether the multimedia program is running on-schedule.

20. The non-transitory computer-readable medium according to claim 19, further having stored thereon a sequence of instructions, which, when executed by the processor to determine whether the multimedia program is running on-schedule, further causes the processor to perform:

determining that a time of occurrence of a portion of audio content exceeds a predetermined threshold;

calculating a time delta based at least in part on the time of occurrence of the portion of audio content and the expected theme song time offset;

calculating at least one of an adjusted start time and an adjusted end time of the multimedia program based on the time delta; and recording, by a recorder, the multimedia program based on at least one of the adjusted start time and the adjusted end time.

21. The non-transitory computer-readable medium according to claim 19, further having stored thereon a sequence of instructions, which, when executed by the processor to determine whether the multimedia program is running on-schedule, further causes the processor to perform:

determining that a time of occurrence of a portion of audio content is below a predetermined threshold; and recording, by a recorder, the multimedia program based on at least one of a scheduled start time and a scheduled end time of the multimedia program.

22. The non-transitory computer-readable medium according to claim 20, wherein the calculating at least one of the adjusted start time and the adjusted end time further includes calculating at least one of the adjusted start time and the adjusted end time based on at least one of a scheduled start time of the multimedia program, a scheduled end time of the multimedia program, an expected theme song time offset of the multimedia program, and a theme song tolerance of the multimedia program.

23. The non-transitory computer-readable medium according to claim 22, further having stored thereon a sequence of instructions, which, when executed by the processor, cause the processor to perform:

retrieving, from the database, at least one of the expected theme song time offset of the multimedia program and the theme song tolerance of the multimedia program.

24. The non-transitory computer-readable medium according to claim 20, wherein at least one of the expected theme song time offset of the multimedia program, and the theme song tolerance of the multimedia program are computed based on statistics for a plurality of occurrences of the multimedia program.

* * * * *